Aug. 19, 1930.  A. W. HAISS  1,773,426
METALLIC BELT
Filed June 13, 1928

Alfred W. Haiss
INVENTOR
BY Williams, Rich
+ Morse
ATTORNEYS

Patented Aug. 19, 1930

1,773,426

UNITED STATES PATENT OFFICE

ALFRED W. HAISS, OF NEW YORK, N. Y., ASSIGNOR TO GEORGE HAISS MANUFACTURING CO. INC., OF NEW YORK, N. Y., A CORPORATION OF NEW YORK

METALLIC BELT

Application filed June 13, 1928. Serial No. 284,889.

This invention relates to metallic belts of the woven-wire type particularly adapted for use with conveyors of the type herein shown and described, although not limited to use in connection with such apparatus.

Woven-wire belts have been employed heretofore in connection with conveyors, but they have been found objectionable because of the fact that the upper or load-carrying reaches thereof sag longitudinally and assume a trough-like shape, when subjected to heavy loads, even in the presence of supporting rollers located beneath such reaches and arranged as close to each other as practicable. When such longitudinal sagging occurs, the outer edges of the load-carrying reach are retracted away from the side walls of the conveyor frame, leaving a space through which material from the load carrying reach of the belt is permitted to fall.

A further objection to woven-wire belts, when employed in connection with conveyors, resides in the fact that the oblique contact of their meshes with the rollers over which they pass at opposite ends of the conveyor has caused the belts to shift or creep longitudinally of the rollers, with the result that such belts are thereby unduly displaced transversely of the conveyor frame.

The general object of this invention is to provide a conveyor belt of the woven-wire type which is so constructed as to obviate the above objections, thereby rendering it practicable in operation, particularly when used in connection with conveyors.

Figure 1:
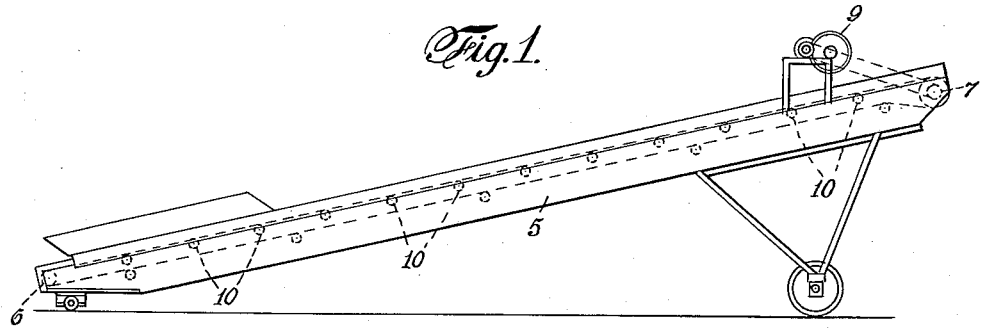
Figure 2:
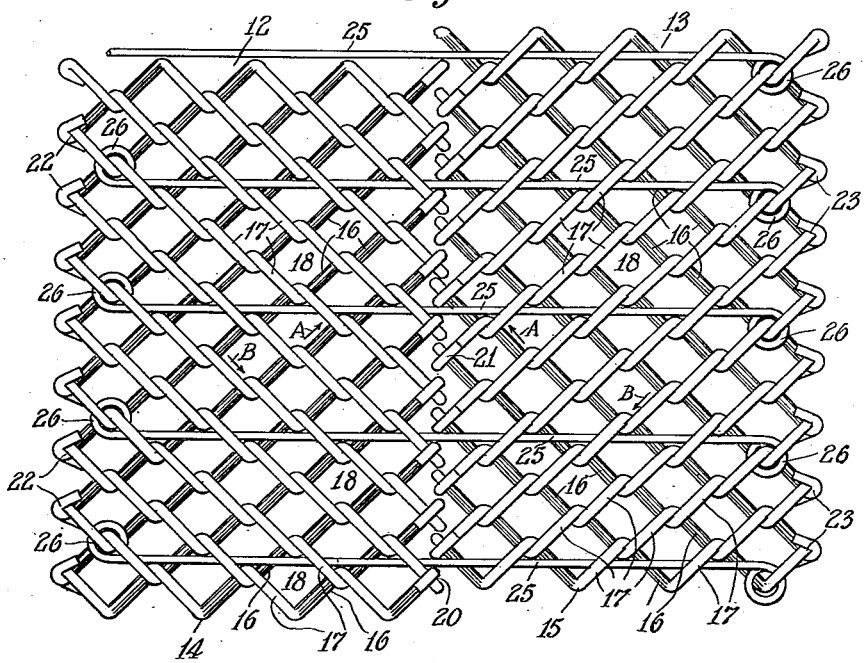

Other objects and advantages of the invention will become apparent from the following description taken in connection with the accompanying drawings in which Figure 1 is a side elevation of a conveyor having the belt embodying this invention incorporated therein; Figure 2 is a fragmental plan view of the belt; and Figure 3 is an enlarged perspective view showing the manner in which the adjacent transverse wires of the longitudinal sections of the belt are connected together along the longitudinal medial line of the belt.

The belt embodying this invention is hereinafter illustrated in connection with a portable conveyor, including an inclined frame 5, in the opposite ends of which are journaled a pair of rollers 6 and 7, over which the conveyor belt is adapted to pass, the roller 7 being connected to and driven by a suitable power unit 9 in such a direction that the upper reach of the belt travels over a plurality of supporting rollers 10 journaled in the inclined frame.

The belt embodying this invention includes a plurality of longitudinal belt sections 12 and 13. These longitudinal sections include a plurality of transversely disposed wires 14 and 15, respectively, the transversely disposed wires of each section being bent at right angles at a plurality of spaced points and there interlocked with each other so that the angular portions 16 of each transverse wire are so related to the oppositely disposed angular portions 17 of the adjacent transverse wire as to form a plurality of openings 18.

Figure 3:
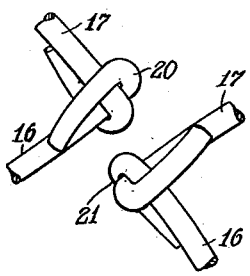

The inner ends of adjacent transverse wires 14 and 15 of the sections 12 and 13, respectively, are connected together by bending their ends over each other as shown best at 20 and 21 in Figure 3. It will be noted that the joined inner ends of each pair of transverse wires of one longitudinal belt section alternate with the joined inner ends of the pairs of transverse wires of the other longitudinal belt section, as shown in Figure 2, and that the joined ends of the transverse wires of one longitudinal belt section are located between the joined ends of the transverse wires of the other longitudinal belt section. At the outer margin of the belt, the ends of adjacent transverse wires 14 and 15 of the longitudinal belt sections 12 and 13, respectively, are connected together by bending their ends over each other, as shown at 22 and 23.

It will be noted that the transverse wires 14 and 15 of the longitudinal sections 12 and 13, respectively, are so bent that all of their angular portions 16 appear at one side of the belt, and that all of their angular portions 17 appear at the opposite side of the belt. It will also be noted that the angular portions 16 are so related to each other as to form in each longitudinal belt section a plurality of parallel ribs which extend from the outer margins of the belt to the longitudinal medial line thereof in the direction of the arrows A, as viewed in Figure 2. The angular portions 17 also form in each longitudinal belt section a plurality of parallel ribs at the opposite side of the belt which are disposed at right angles to the ribs joined by the angular portions 16 and extend in the directions of the arrows B from the outer margins of the belt toward the longitudinal medial line thereof, as viewed in Figure 2. The weave of the belt sections 12 and 13 is such that the ribs formed by the angular portions 16 of one section are at right angles to those of the other section, and likewise, this is true of the ribs formed by the angular portions 17.

The belt sections 12 and 13 are held in a side-by-side relation to each other by transversely disposed tie-rods 25 which are spaced from each other at suitable intervals. These tie-rods 25 are threaded through the sections 12 and 13 and are attached to the outer margins thereof by bending their outer ends around certain of the transverse wires 14 and 15 at their respective points of interlocking as shown at 26. By thus securing the tie-rods to the belt sections 12 and 13, such sections are held against separation and the tie-rods are anchored against longitudinal displacement.

By forming the belt of relatively narrow longitudinal sections, the inner margins of such sections assume positions in the vicinity of the longitudinal center of the belt where they are utilized to reinforce the belt against longitudinal sagging at that point. Such sagging as would theoretically occur in the belt embodying this invention is of necessity confined to the individual belt sections 12 and 13, but due to the fact that these sections are relatively narrow, as compared with the width of the belt, very little, if any, sagging occurs therein, with the result that the belt may be satisfactorily used and operated under the most adverse conditions.

Furthermore, shifting of the belt longitudinally of the rollers over which it is adapted to travel is obviated, due to the fact that, regardless of which side may be placed next to the rollers, the ribs, formed by the angular portions 16 in one instance and by the angular portions 17 in the other instance, are so disposed that the tendency of the belt to creep in one direction is off-set by an equal tendency for it to creep in an opposite direction.

Having thus described the invention, what is claimed is:

1. A metal belt comprising a plurality of separate belt sections extending longitudinally of the belt and arranged side by side and including transversely disposed interlocking wires having angular contacting portions forming ribs extending diagonally of their respective sections, the inclination of the ribs of one section being opposite to the inclination of the ribs of the other section, and a plurality of independent cross-ties located wholly within the belt structure and connecting said longitudinal sections and cooperating therewith to hold them in an adjacent relation to each other but permit longitudinal flexure of the belt.

2. In a metal belt, a plurality of separate woven-wire belt sections extending longitudinally of the belt and arranged side by side and including transversely disposed interlocking wires having angular contacting portions forming ribs extending diagonally of their respective sections, the inclination of the ribs of one section being opposite to the inclination of the ribs of the other section, and a plurality of tie-rods threaded transversely through said longitudinal belt sections and having their ends connected to the outer margins of said longitudinal sections and cooperating with said longitudinal sections to hold them in adjacent relation to each other.

In testimony whereof, I have affixed my signature to this specification.

ALFRED W. HAISS.